United States Patent
Maeda et al.

(10) Patent No.: US 6,835,444 B2
(45) Date of Patent: Dec. 28, 2004

(54) MAGNETIC RECORDING MEDIUM USING A PERPENDICULAR MAGNETIC FILM HAVING A TBR NOT EXCEEDING ONE-FIFTH OF A TBR OF AN IN-PLANE MAGNETIC FILM

(75) Inventors: Maki Maeda, Kawasaki (JP); Hiroto Takeshita, Kawasaki (JP); Takuya Uzumaki, Kawasaki (JP); Atsushi Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 45 days.

(21) Appl. No.: 09/976,767

(22) Filed: Oct. 12, 2001

(65) Prior Publication Data

US 2002/0150793 A1 Oct. 17, 2002

(30) Foreign Application Priority Data

Apr. 13, 2001 (JP) ...................................... 2001-116020

(51) Int. Cl.[7] ................................................ G11B 5/66
(52) U.S. Cl. ...................... 428/212; 428/215; 428/336; 428/409; 428/694 TM
(58) Field of Search ................................ 428/212, 215, 428/336, 409, 694 TM

(56) References Cited

U.S. PATENT DOCUMENTS

| | | | | |
|---|---|---|---|---|
| 5,326,637 A | * | 7/1994 | Nasu et al. .................. | 428/336 |
| 5,605,733 A | | 2/1997 | Ishikawa et al. ............ | 428/65.3 |
| 6,274,233 B1 | * | 8/2001 | Yoshikawa et al. ......... | 428/332 |
| 2002/0028356 A1 | * | 3/2002 | Kawato et al. ...... | 428/694 TM |
| 2002/0068197 A1 | * | 6/2002 | Ejiri et al. ........... | 428/694 TM |
| 2002/0127433 A1 | * | 9/2002 | Shimizu et al. ...... | 428/694 TM |
| 2003/0017370 A1 | * | 1/2003 | Shimizu et al. ...... | 428/694 TM |
| 2003/0022025 A1 | * | 1/2003 | Futamoto et al. .... | 428/694 TM |

FOREIGN PATENT DOCUMENTS

| | | |
|---|---|---|
| DE | 3541 857 | 6/1986 |
| JP | 4-211811 | 11/1992 |
| JP | 5-67320 | 3/1993 |
| JP | 5-189737 | 7/1993 |
| JP | 11-283229 | 10/1999 |

OTHER PUBLICATIONS

JPO Abstract Translation of JP 60–025027–A (Document ID: JP 60025027 A).*
Ando, T and Nishihara, T. (IEEE Trans. Mag., 33(5), 1997, 2983–2985).*
Kurokawa, Y., Nagasaki, A., Homma, T., and Osaka, T. (IEEE Trans. Mag., 32(5), 1996, 3810–3812).*
ISU Ceramics: Products (http://www.isu.co.kr/ceramics/eng/prod_03).*

* cited by examiner

Primary Examiner—Kevin M. Bernatz
(74) Attorney, Agent, or Firm—Greer, Burns & Crain, Ltd.

(57) ABSTRACT

A magnetic recording medium is provided. The magnetic recording medium comprises an in-plane magnetic film used for recording, and a perpendicular magnetic film formed on the in-plane magnetic film. The in-plane magnetic film has a magnetization easy axis in an in-plane direction. The perpendicular magnetic film has a magnetization easy axis oriented in a direction perpendicular to the magnetization easy axis of the in-plane magnetic film. A tBr (a product of a thickness and a residual magnetization) of the perpendicular magnetic film is set so as not to exceed one-fifth of a tBr of the in-plane magnetic film at the maximum.

8 Claims, 11 Drawing Sheets

FIG.2

| | THICKNESS (nm) | PARTICLE DIAMETER (nm) | EXCHANGE INTERACTION PARDMETER he |
|---|---|---|---|
| IN-PLANE SINGLE-LAYER MEDIUM | 10 | 5 | 0.05 |
| PERPENDICULAR/ IN-PLANE COMPOSITE MEDIUM | 1/1/10 * | | |

* IN THE ORDER OF PERPENDICULAR MAGNETIC FILM, NONMAGNETIC SPACER, AND IN-PLANE MAGNETIC FILM.

FIG.3

| | PERPENDICULAR MAGNETIC FILM | | | IN-PLANE MAGNETIC FILM | | | V (%) | TRANSITION BREADTH πa (%) |
|---|---|---|---|---|---|---|---|---|
| | Ms (emu/cc) | Hk (kOe) | tBr (Gμm) | Ms (emu/cc) | Hk (kOe) | tBr (Gμm) | | |
| IN-PLANE SINGLE-LAYER MEDIUM | — | — | — | 500 | 4 | 47.1 | 0% | 0% |
| PERPENDICULAR/ IN-PLANE COMPOSITE MEDIUM | 250 | 8 | 3.1 | | | | −1.6% | −0.4% |
| | 500 | 8 | 6.3 | | | | −16.0% | 7.9% |

FIG.4

| | THICKNESS (nm) | PARTICLE DIAMETER (nm) | EXCHANGE INTERACTION PARDMETER he |
|---|---|---|---|
| IN-PLANE SINGLE-LAYER MEDIUM | 6 | 5 | 0.05 |
| PERPENDICULAR/ IN-PLANE COMPOSITE MEDIUM | 1/1/6* | | |

* IN THE ORDER OF PERPENDICULAR MAGNETIC FILM, NONMAGNETIC SPACER, AND IN-PLANE MAGNETIC FILM.

FIG.5

| | | PERPENDICULAR MAGNETIC FILM | | | IN-PLANE MAGNETIC FILM | | | Output@460kfci | S/N@460kfci | |
|---|---|---|---|---|---|---|---|---|---|---|
| | | Ms (emu/cc) | Hk (kOe) | tBr (Gum) | Ms (emu/cc) | Hk (kOe) | tBr (Gum) | V (%) | S/Nm (dB) | DIFFERENTIAL (dB) |
| IN-PLANE SINGLE-LAYER MEDIUM | ① | | | | 600 | 12.6 | 56.5 | 0.0% | 13.9 | 0.0 |
| | ② | 600 | 22 | 7.5 | | | | −1.0% | 14.8 | +0.9 |
| PERPENDICULAR/ IN-PLANE COMPOSITE MEDIUM | ③ | 200 | 18 | 2.5 | | | | −6.3% | 15.1 | +1.2 |
| | ④ | 200 | 15 | 2.5 | | | | −3.6% | 14.2 | +0.3 |
| | ⑤ | 200 | 10 | 2.5 | | | | 2.5% | 14.2 | +0.3 |

FIG.7

| RECORDING HEAD MAGNETIC FIELD AT THE CENTER OF THE MEDIUM (kOe) | Ms OF IN-PLANE MAGNETIC FILM (emu/cc) | Hk OF IN-PLANE MAGNETIC FILM (kOe) | Ms OF PERPENDICULAR MAGNETIC FILM (emu/cc) | Hk OF PERPENDICULAR MAGNETIC FILM (kOe) |
|---|---|---|---|---|
| 7.1 | 600 | 12.6 | 200 | 17.5 |
| 7.5 | 600 | 12.6 | 200 | 18.0 |
| 8.5 | 600 | 12.6 | 200 | 18.0 |

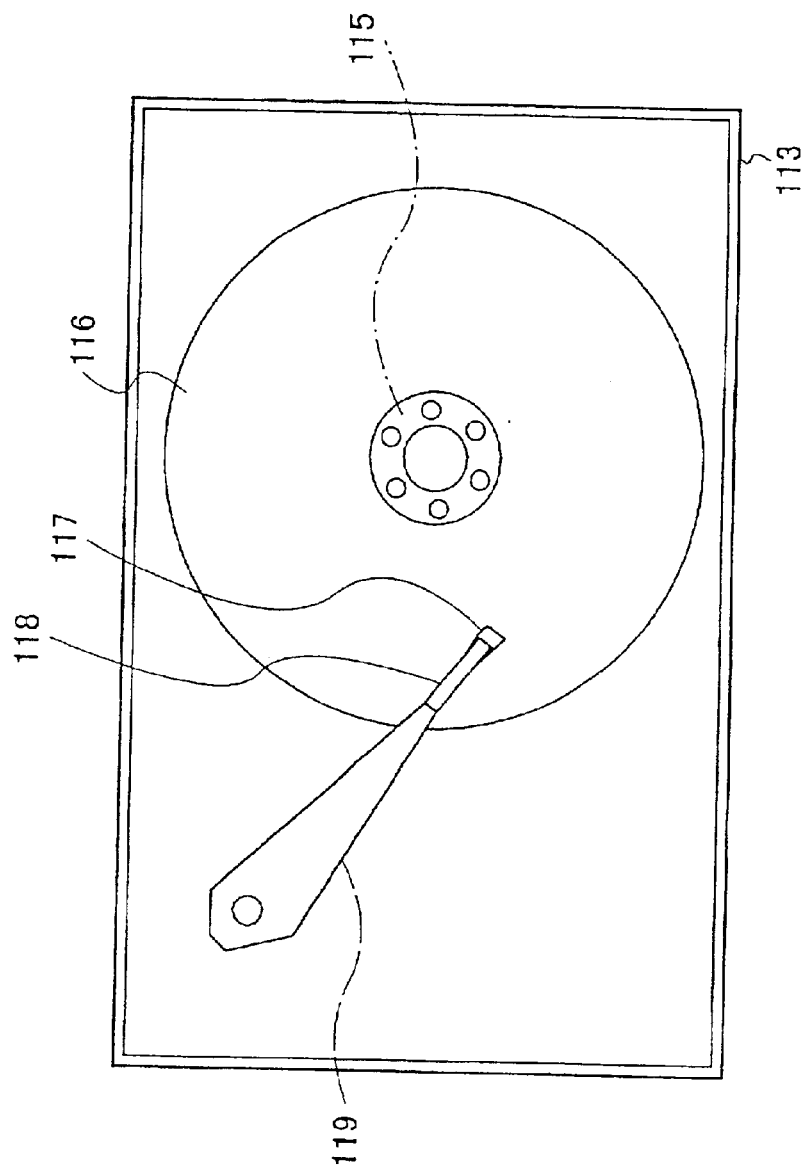

MAGNETIC RECORDING MEDIUM USING A PERPENDICULAR MAGNETIC FILM HAVING A TBR NOT EXCEEDING ONE-FIFTH OF A TBR OF AN IN-PLANE MAGNETIC FILM

BACKGROUND OF THE INVENTION

1. Field of the Invention

The present invention generally relates to a magnetic recording medium, and, more particularly, to a magnetic recording medium used in a magnetic recording and reproducing device employed as an external memory device for an information processing device such as a computer.

2. Description of the Related Art

Conventionally, in regard to a recording layer of a magnetic recording medium such as a hard disk, a technology of combining a perpendicular magnetic film and an in-plane magnetic film has been a frequently studied issue. For example, Japanese Laid-Open Patent Application No. 11-283229 discloses a recording method, in which a perpendicular magnetic film is formed thick, and a recording is performed to the perpendicular magnetic film by using a magnetic head for use in an in-plane recording. This recording method provides an advantage of not necessitating a waveform processing, because this method can obtain a reproduction waveform of the in-plane-recording type, despite being a recording method for a perpendicular magnetic film.

Additionally, Japanese Laid-Open Patent Application No. 5-189737 discloses a method of combining two types of hard magnetic orientation films (a perpendicular magnetic film and an in-plane magnetic film) in which magnetic reversal modes become a domain-wall-transition type and a magnetic-rotation type, respectively, at transition positions (magnetic reversal positions) in a recording state. This method is supposed to contribute to improving an overwrite property and increasing an S/N ratio.

With respect to a magnetic recording medium of a composite type combining a perpendicular magnetic film and an in-plane magnetic film as above, many proposals have been made in regard to a method to perform a recording to the perpendicular magnetic film. However, none of these proposals has made the magnetic recording medium satisfactory enough to be used in a practical level.

Thereupon, with respect to such a magnetic recording medium of a composite type using a perpendicular magnetic film and an in-plane magnetic film, there has recently been a proposal that the in-plane magnetic film be used to function as a recording layer, and the perpendicular magnetic film be used as an auxiliary film to enhance the function of the in-plane magnetic film. It is pointed out that combining the perpendicular magnetic film with the in-plane magnetic film forms a horseshoe magnetization mode that causes a return current in a magnetic field from the in-plane magnetic film, and thus, this magnetic recording medium can achieve an increase in output and a decrease in noise so as to perform a high-density recording.

However, the above-mentioned composite magnetic recording medium using the in-plane magnetic film as a recording layer has problems of the occurrence of noises due to a diamagnetic field at a transition position of the in-plane magnetic film, and a distortion in a reproduction waveform as a result of combining the perpendicular magnetic film to the in-plane magnetic film. So far, no composite magnetic recording medium using the in-plane magnetic film as a recording layer has been devised to have a preferable structure that solves these problems.

SUMMARY OF THE INVENTION

It is a general object of the present invention to provide an improved and useful magnetic recording medium in which the above-mentioned problems are eliminated.

A more specific object of the present invention is to provide a magnetic recording medium of a composite type having a perpendicular magnetic film combined with an in-plane magnetic film used as a recording layer so as to decrease noises and prevent a distortion in a reproduction waveform.

In order to achieve the above-mentioned objects, there is provided according to one aspect of the present invention a magnetic recording medium comprising:

an in-plane magnetic film used for recording, the in-plane magnetic film having a magnetization easy axis in an in-plane direction; and a perpendicular magnetic film formed on the in-plane magnetic film, the perpendicular magnetic film having a magnetization easy axis oriented in a direction perpendicular to the magnetization easy axis of the in-plane magnetic film, wherein a tBr of the perpendicular magnetic film is set so as not to exceed one-fifth of a tBr of the in-plane magnetic film at the maximum, where the tBr is the product of a thickness and a residual magnetization.

According to the present invention, since the magnetic condition of the perpendicular magnetic film is restricted within a predetermined range, the perpendicular magnetic film sufficiently functions as an auxiliary film to the in-plane magnetic film; thus, the magnetic recording medium can have a composite structure that can restrain a distortion of a reproduction waveform so as to obtain a high S/N ratio.

It is sufficient that the tBr of the perpendicular magnetic film is set so as not to exceed $\frac{1}{5}$ of the tBr of the in-plane magnetic film. More preferably, the tBr of the perpendicular magnetic film is set so as not to exceed $\frac{1}{10}$ of the tBr of the in-plane magnetic film.

Additionally, in the magnetic recording medium according to the present invention, the perpendicular magnetic film may have a thickness not exceeding 5 nm at the maximum.

According to the present invention, the magnetic recording medium can surely restrain the distortion of the reproduction waveform.

Additionally, in the magnetic recording medium according to the present invention, an anisotropic magnetic field Hk of the perpendicular magnetic film may be set at least 1.2 times as large as an anisotropic magnetic field Hk of the in-plane magnetic film.

According to the present invention, a transition position of the perpendicular magnetic film can be arranged to surely coincide with a transition position of the in-plane magnetic film so as to reduce a diamagnetic field likely to occur at the transition position of the in-plane magnetic film; this contributes to decreasing noises.

Additionally, the magnetic recording medium according to the present invention may further comprise a nonmagnetic spacer provided between the in-plane magnetic film and the perpendicular magnetic film.

According to the present invention, the perpendicular magnetic film can be easily formed on the in-plane magnetic film via the nonmagnetic spacer.

Additionally, in the magnetic recording medium according to the present invention, the nonmagnetic spacer may have a thickness not exceeding 2 nm.

According to the present invention, a distance between a magnetic recording/reproducing head and the in-plane magnetic film used as a recording layer can be maintained preferably.

Additionally, in the magnetic recording medium according to the present invention, the perpendicular magnetic film may be formed of one of a Co-group alloy and a Co-group artificial lattice film.

According to the present invention, the magnetic recording medium can have a more preferable perpendicular magnetic film.

In order to achieve the above-mentioned objects, there is also provided according to another aspect of the present invention a magnetic recording and reproducing device including:

a magnetic recording medium comprising:

an in-plane magnetic film used for recording, the in-plane magnetic film having a magnetization easy axis in an in-plane direction; and a perpendicular magnetic film formed on the in-plane magnetic film, the perpendicular magnetic film having a magnetization easy axis oriented in a direction perpendicular to the magnetization easy axis of the in-plane magnetic film, wherein a tBr of the perpendicular magnetic film is set so as not to exceed one-fifth of a tBr of the in-plane magnetic film at the maximum, where the tBr is the product of a thickness and a residual magnetization.

The magnetic recording and reproducing device according to the present invention can reduce noises and exhibit an excellent reproduction waveform, and thus can perform a recording with a high density and a high sensitivity.

Other objects, features and advantages of the present invention will become more apparent from the following detailed description when read in conjunction with the accompanying drawings.

BRIEF DESCRIPTION OF THE DRAWINGS

FIG. 2 is a table showing main structural features of a perpendicular/in-plane composite medium according to a first embodiment of the present invention and an in-plane single-layer medium as a comparison;

FIG. 3 is a table showing magnetic characteristics of the perpendicular/in-plane composite medium according to the first embodiment of the present invention and the in-plane single-layer medium, when recording and reproducing were performed to these mediums by the magnetic head;

FIG. 4 is a table showing main structural features of a perpendicular/in-plane composite medium according to a second embodiment of the present invention and an in-plane single-layer medium as a comparison;

FIG. 5 is a table showing magnetic characteristics of the perpendicular/in-plane composite medium according to the second embodiment of the present invention and the in-plane single-layer medium, when recording and reproducing were performed to these mediums by the magnetic head;

FIG. 7 is a table showing conditions of magnetic films when a magnetic field of the recording head is changed;

FIG. 10 is a plan view of the main structure of the magnetic recording and reproducing device shown in FIG. 9.

DETAILED DESCRIPTION OF THE PREFERRED EMBODIMENTS

A description will now be given, with reference to the drawings, of embodiments according to the present invention.

A magnetic recording medium of a composite type (hereinafter referred to as a perpendicular/in-plane composite medium) according to the present embodiments comprises an in-plane magnetic film formed on a substrate (not shown in the figures), and a perpendicular magnetic film formed on the in-plane magnetic film. The in-plane magnetic film has a magnetization easy axis in an in-plane direction. The perpendicular magnetic film has a magnetization easy axis oriented in a direction perpendicular to the substrate. This perpendicular/in-plane composite medium is preferred to have a nonmagnetic spacer inserted between the in-plane magnetic film and the perpendicular magnetic film. Accordingly, in the following description of the present embodiments, the perpendicular/in-plane composite medium having a lamination of the in-plane magnetic film, the nonmagnetic spacer and the perpendicular magnetic film is taken as an example.

Besides, in this perpendicular/in-plane composite medium, the in-plane magnetic film functions as a recording layer, and the perpendicular magnetic film formed thereon functions as an auxiliary film.

Magnetic materials such as CoCrPt and CoCrPtB can be used as the in-plane magnetic film. Generally used magnetic materials such as CoCr-group alloys can be used as the perpendicular magnetic film. However, magnetic materials such as Co-group alloys and Co-group artificial lattice films may preferably be used as the perpendicular magnetic film so that the perpendicular magnetic film has a high anisotropic magnetic field Hk. The preferable Co-group alloys include CoCrPt, TbFeCo, CoPt and FePt. The preferable Co-group artificial lattice films include Co/Pt and Co/Pd. Materials such as CoCr-group alloys can be used as the nonmagnetic spacer so as to improve a crystallinity of the perpendicular magnetic film formed thereon.

The in-plane magnetic film can be made, for example, approximately 5–20 nm in thickness, and the perpendicular magnetic film can be made approximately 1–5 nm in thickness. Especially, it is preferred that the perpendicular magnetic film is made approximately 5 nm thick at the maximum.

Additionally, in order to provide an easy understanding, the following description of the perpendicular/in-plane composite medium according to the present embodiments will be made in comparison with a magnetic recording medium comprising a general in-plane magnetic film as a single layer (hereinafter referred to as an in-plane single-layer medium), the general in-plane magnetic film having a magnetization easy axis in an in-plane direction.

Figure 1:
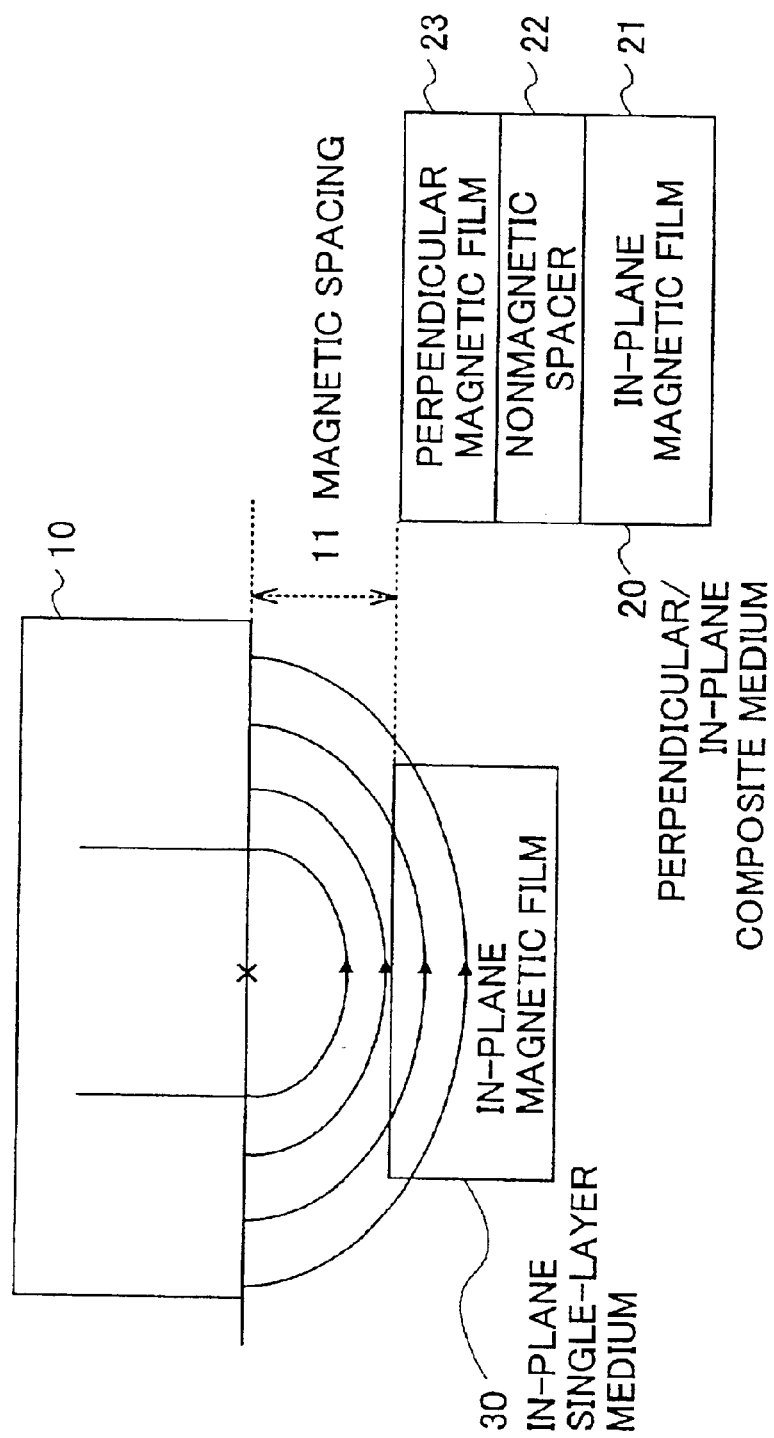
FIG. 1 shows a relationship between a magnetic head of an in-plane recording type and magnetic recording mediums.

FIG. 1 shows a relationship between a magnetic head 10 of an in-plane recording type and the magnetic recording mediums. In FIG. 1, a recording is performed to a perpendicular/in-plane composite medium 20 according to the present embodiments and an in-plane single-layer medium 30 by the magnetic head 10 with a coinciding magnetic spacing 11. Magnetic information is recorded or reproduced to/from the perpendicular/in-plane composite medium 20 according to the present embodiments by the magnetic head 10 as above.

As described above, the perpendicular/in-plane composite medium 20 comprises a laminated structure of an in-plane magnetic film 21, a nonmagnetic spacer 22 and a perpendicular magnetic film 23.

In the present embodiments, preconditions are set regarding the perpendicular/in-plane composite medium 20 and the in-plane single-layer medium 30 as follows. A parameter he of an exchange interaction between magnetic particles in the films of the perpendicular/in-plane composite medium 20 and the in-plane single-layer medium 30 was 0.05. A transition breadth and an S/N ratio were calculated by recording a dye bit at each recording density. The transition breadth was estimated by approximating residual magnetic components in the in-plane direction by an arc tangent function. It is noted here that, regarding the transition breadth of the composite medium, although in-plane magnetic components of the perpendicular magnetic film are added in proportion to the thickness, it has been ascertained that this addition does not influence the reduction of the transition breadth, because the perpendicular magnetic film has a low tBr (the product of the thickness and the residual magnetization). A noise in the S/N ratio was calculated by integrating fluctuating components in reproduction output.

[Embodiment 1]

FIG. 2 is a table showing main structural features of the perpendicular/in-plane composite medium 20 according to a first embodiment and the in-plane single-layer medium 30 as a comparison.

As shown in FIG. 1 and FIG. 2, the perpendicular/in-plane composite medium 20 according to the present embodiment comprises the in-plane magnetic film 10 nm thick, the nonmagnetic spacer 1 nm thick, and the perpendicular magnetic film 1 nm thick laminated in this order from the bottom. On the other hand, the in-plane single-layer medium 30 comprises only the in-plane magnetic film 10 nm thick as a single layer. The diameter of magnetic particles in each of these films is adjusted to 5 nm. The parameter he of the exchange interaction between the magnetic particles is 0.05.

As for the recording and reproducing magnetic head 10 shown in FIG. 1, the magnetic spacing was adjusted to 24 nm, and a write head magnetic field was adjusted to 2 k Oe (at the center of the medium 10 nm thick). A write gap length was adjusted to 0.2 $\mu$m, and a read gap length was adjusted to 0.09 $\mu$m.

FIG. 3 is a table showing magnetic characteristics of the perpendicular/in-plane composite medium 20 according to the present embodiment and the in-plane single-layer medium 30, when recording and reproducing were performed to these mediums by the magnetic head 10.

Two types of the perpendicular/in-plane composite medium 20 were prepared, by forming two types of the perpendicular magnetic film, one having an anisotropic magnetic field Hk of 8 k Oe, a saturation magnetization Ms of 250 emu/cc, and a tBr of 3.1 G$\mu$m, and the other having an anisotropic magnetic field Hk of 8 k Oe, a saturation magnetization Ms of 500 emu/cc, and a tBr of 6.3 G$\mu$m.

FIG. 3 compares changes (%) in an output V and a transition breadth $\pi$a of the two types of the perpendicular magnetic film of the perpendicular/in-plane composite medium 20 having the saturation magnetizations Ms of 250 emu/cc and 500 emu/cc (the tBr of 3.1 G$\mu$m and the tBr of 6.3 G$\mu$m), respectively, on the basis of the in-plane single-layer medium 30 having a tBr of 47.1 G$\mu$m. The recording density was adjusted to 200 kfci.

Two columns on the right side of the table in FIG. 3 show the output V and the transition breadth $\pi$a (percentages based on the in-plane single-layer medium 30). In these columns, the in-plane single-layer medium 30 formed only by the in-plane magnetic film represents the basis of 0%, and changes in the output V and the transition breadth $\pi$a are represented in percentages for the two types of the perpendicular/in-plane composite medium 20.

As a magnetic recording medium, it is preferred that the output V is large. In terms of noise reduction, the transition breadth $\pi$a is preferred to be small.

In this comparison, when the perpendicular magnetic film has the high tBr of 6.3, it can be ascertained that the output V decreases remarkably, compared to the perpendicular magnetic film having the tBr of 3.1 G$\mu$m. To the contrary, it can be ascertained that the transition breadth $\pi$a increases, when the tBr is high.

Accordingly, it is understood that the tBr of the perpendicular magnetic film needs to be restricted low.

A group including inventors of the present invention has ascertained that the tBr of the perpendicular magnetic film is preferred to be set so as not to exceed 1/5 of the tBr of the in-plane magnetic film. More preferably, the tBr of the perpendicular magnetic film is set so as not to exceed 1/10 of the tBr of the in-plane magnetic film.

That is, when the tBr of the perpendicular magnetic film is high, the transition breadth expands due to a magnetostatic interaction to the in-plane magnetic film. Thus, it is important that the magnetostatic interaction is restricted to a moderate degree. For that purpose, it is effective to decrease the tBr of the perpendicular magnetic film, and to insert the nonmagnetic spacer approximately 1 nm thick. Since the thickness of the nonmagnetic spacer influences the magnetic spacing to the magnetic head, it is preferred that the thickness of the nonmagnetic spacer is approximately 2 nm at the thickest. From the same point of view, it is preferred that the thickness of the perpendicular magnetic film is so designed not to exceed 5 nm.

[Embodiment 2]

FIG. 4 is a table showing main structural features of the perpendicular/in-plane composite medium 20 according to a second embodiment and the in-plane single-layer medium 30 as a comparison.

As shown in FIG. 4, the perpendicular/in-plane composite medium 20 according to the present second embodiment comprises the in-plane magnetic film 5 nm thick which is thinner than the first embodiment shown in FIG. 2. The nonmagnetic spacer is 1 nm thick, and the perpendicular magnetic film is 1 nm thick, as in the first embodiment.

In the present second embodiment, the in-plane single-layer medium 30 comprises only the in-plane magnetic film 6 nm thick as a single layer. The diameter of magnetic particles in each of these films is adjusted to 5 nm, as in the first embodiment shown in FIG. 2. The parameter he of the exchange interaction between the magnetic particles is 0.05, also as in the first embodiment.

Also, in the present second embodiment, the conditions regarding the magnetic head 10 are changed from the first embodiment. Specifically, the magnetic spacing was changed to 17 nm, and the write head magnetic field was changed to 7.5 k Oe (at the center of the medium 6 nm thick). The write gap length was adjusted to 0.15 μm, and the read gap length was adjusted to 0.05 μm.

FIG. 5 is a table showing magnetic characteristics of the perpendicular/in-plane composite medium 20 according to the present embodiment and the in-plane single-layer medium 30, when recording and reproducing were performed to these mediums by the magnetic head 10.

As shown in FIG. 5, a plurality of types of the perpendicular/in-plane composite medium 20 were prepared, by forming a plurality of types of the perpendicular magnetic film having the saturation magnetizations Ms of 600 emu/cc and 200 emu/cc (the tBr of 7.5 G μm and the tBr of 2.5 G μm), in comparison with the in-plane single-layer medium 30 having the tBr of 56.5 G μm.

In FIG. 5, in types ② and ③ of the perpendicular/in-plane composite medium 20, the perpendicular magnetic film and the in-plane magnetic film have coinciding transition positions. On the other hand, in types ④ and ⑤ of the perpendicular/in-plane composite medium 20, the perpendicular magnetic film and the in-plane magnetic film have transition positions not coinciding with each other.

In the present embodiment, influences to a reproduction (output) waveform and an S/N were ascertained, depending on whether or not the perpendicular magnetic film and the in-plane magnetic film have the coinciding transition positions.

In the present second embodiment, the four types ②, ③, ④ and ⑤ of the perpendicular/in-plane composite medium 20 were prepared. ① is the in-plane single-layer medium 30 as a comparison.

The transition positions of the in-plane magnetic films and the perpendicular magnetic films in these four types of the perpendicular/in-plane composite mediums were adjusted by varying the anisotropic magnetic fields Hk of the perpendicular magnetic films.

In FIG. 5, the types ② and ③ of the perpendicular/in-plane composite medium are cases, in which the transition positions coincide with each other. The type ④ is a case in which the transition positions do not coincide with each other by one magnetic particle (approximately 5 nm). The type ⑤ is a case in which the transition positions do not coincide with each other by four magnetic particles (approximately 21 nm).

The group including the inventors of the present invention has ascertained that in order to prevent the state in which the transition position of the perpendicular magnetic film does not coincide with the transition position of the in-plane magnetic film, the anisotropic magnetic field Hk of the perpendicular magnetic film needs to be at least 1.2 times as large as the anisotropic magnetic field Hk of the in-plane magnetic film. Thus, the transition position of the perpendicular magnetic film can be arranged to coincide with the transition position of the in-plane magnetic film by adjusting the intensity of the anisotropic magnetic field Hk of the perpendicular magnetic film. Besides, in the present second embodiment, the recording density was adjusted to 460 kfci.

According to FIG. 5, with respect to the type ③ in which the transition position of the perpendicular magnetic film coincides with the transition position of the in-plane magnetic film, the S/N increases by 15.1, whereas the output decreases by 6.3%, compared to the in-plane single-layer medium 30 ① as a comparison. Differentials in S/N (from the S/N of the in-plane single-layer medium 30 ①) shown in the rightmost column in the table shown in FIG. 5 can be regarded as a comprehensive evaluation for each of the types of the perpendicular/in-plane composite medium 20, on the basis of the in-plane single-layer medium 30 ① as a comparison. According to this comprehensive evaluation, the type ③ of the perpendicular/in-plane composite medium provides a remarkable noise reduction despite the decreased output V, with the SIN differential of +1.2 dB from the in-plane single-layer medium 30.

In addition, regarding the types ② and ③ of the perpendicular/in-plane composite medium in which the transition positions coincide with each other, setting the tBr of the perpendicular magnetic film so as not to exceed ⅕ of the tBr of the in-plane magnetic film can achieve a high S/N ratio.

The tBr of the perpendicular magnetic film of the type ③ of the perpendicular/in-plane composite medium is 2.5, and the tBr of the in-plane magnetic film thereof is 56.5, where (2.5/56.5)=<(⅕) stands. The tBr of the perpendicular magnetic film of the type ② of the perpendicular/in-plane composite medium is 7.5, where (7.5/56.5)=<(⅕) also stands.

Accordingly, the type ② of the perpendicular/in-plane composite medium obtains an S/N differential of +0.9 dB from the in-plane single-layer medium 30 ①. However, in order to obtain an S/N ration as high as the type ③ of the perpendicular/in-plane composite, the tBr of the perpendicular magnetic film needs to be designed so as not to exceed 1/10 of the tBr of the in-plane magnetic film.

Besides, regarding the types ④ and ⑤ of the perpendicular/in-plane composite medium, since the tBr of the perpendicular magnetic film is designed so as not to exceed 1/10 of the tBr of the in-plane magnetic film, these types ④ and ⑤ gain a good evaluation in comparison with the in-plane single-layer medium 30 ① but not so excellent as the type ③.

In order to achieve the suitable perpendicular/in-plane composite medium 20, the tBr of the perpendicular magnetic film is preferred to be restricted to a predetermined value lower than the tBr of the in-plane magnetic film, and the transition position of the perpendicular magnetic film is preferred to be arranged to coincide with the transition position of the in-plane magnetic film. It is inferred that, by arranging these transition positions to coincide with each other, the magnetization of the perpendicular magnetic film functions so as to cause a return current of a magnetic field at the transition position of the in-plane magnetic film. This reduces a diamagnetic field at the transition position of the in-plane magnetic film.

It is noted that, regarding the types ② and ③ of the perpendicular/in-plane composite medium, the anisotropic magnetic field Hk of the perpendicular magnetic film is 1.2 times or more as large as the anisotropic magnetic field Hk of the in-plane magnetic film.

Figure 6A:
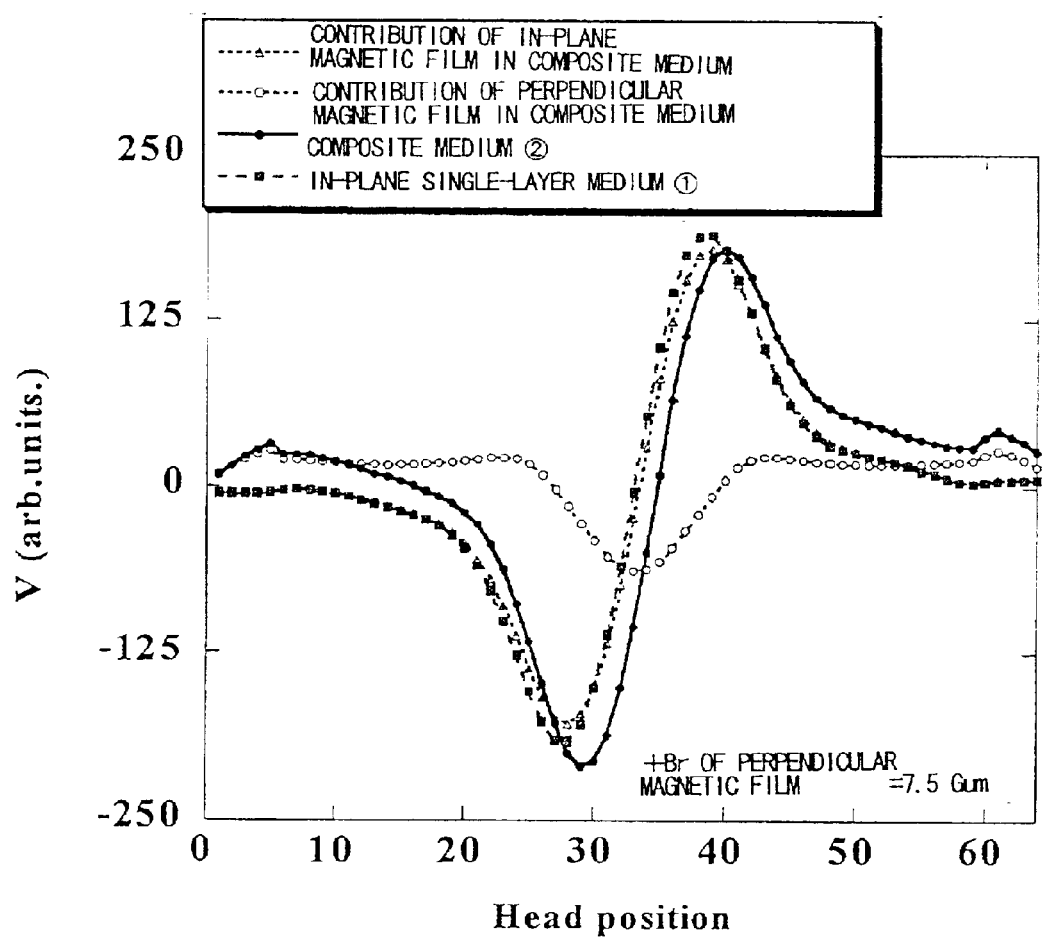
FIG. 6A is a diagram showing reproduction waveforms of a type ② of the perpendicular/in-plane composite medium and the in-plane single-layer medium ① in comparison.
Figure 6B:
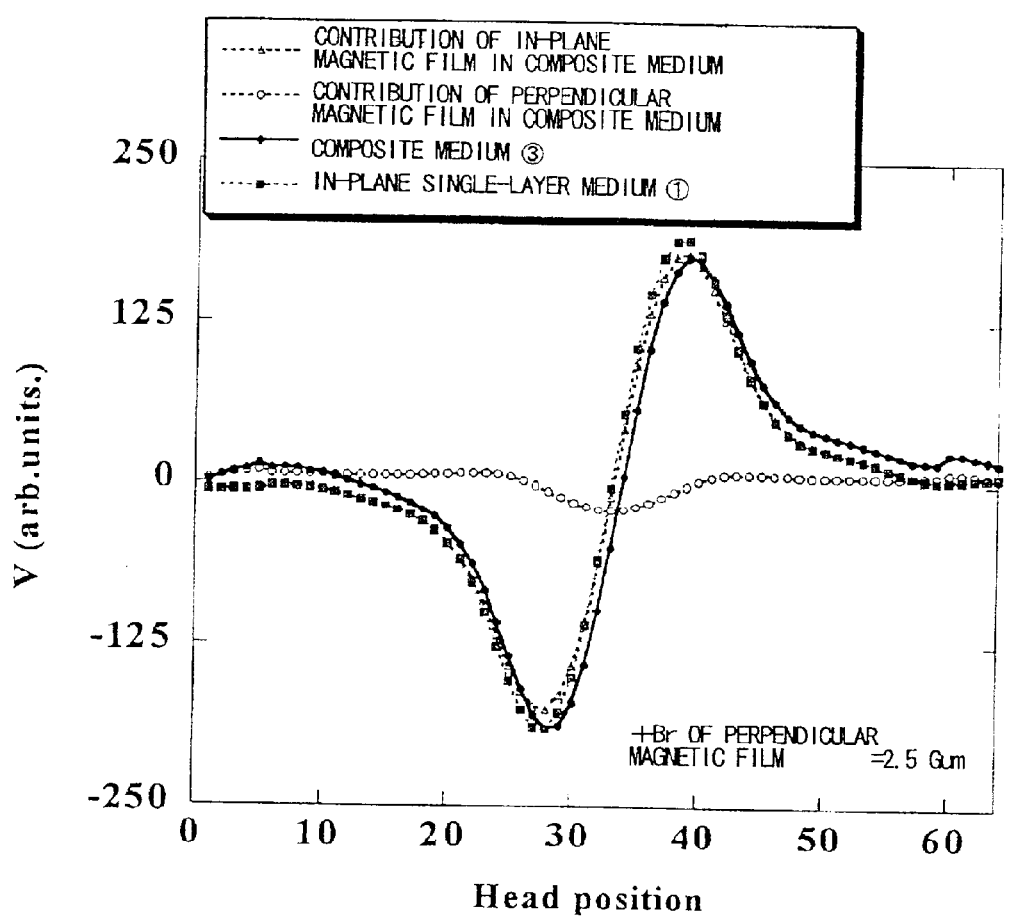
FIG. 6B is a diagram showing reproduction waveforms of a type ③ of the perpendicular/in-plane composite medium and the in-plane single-layer medium ① in comparison.

FIG. 6A is a diagram showing reproduction waveforms of the type ② of the perpendicular/in-plane composite medium and the in-plane single-layer medium ① in comparison. FIG. 6B is a diagram showing reproduction waveforms of the type ③ of the perpendicular/in-plane composite medium and the in-plane single-layer medium ① in comparison.

In the type ③ of the perpendicular/in-plane composite medium having the low tBr of the perpendicular magnetic film shown in FIG. 6B, a distortion of the reproduction waveform due to the presence of the perpendicular magnetic film is restricted to a lower degree, compared to the type ② of the perpendicular/in-plane composite medium having the high tBr of the perpendicular magnetic film shown in FIG. 6A.

Figure 8A:
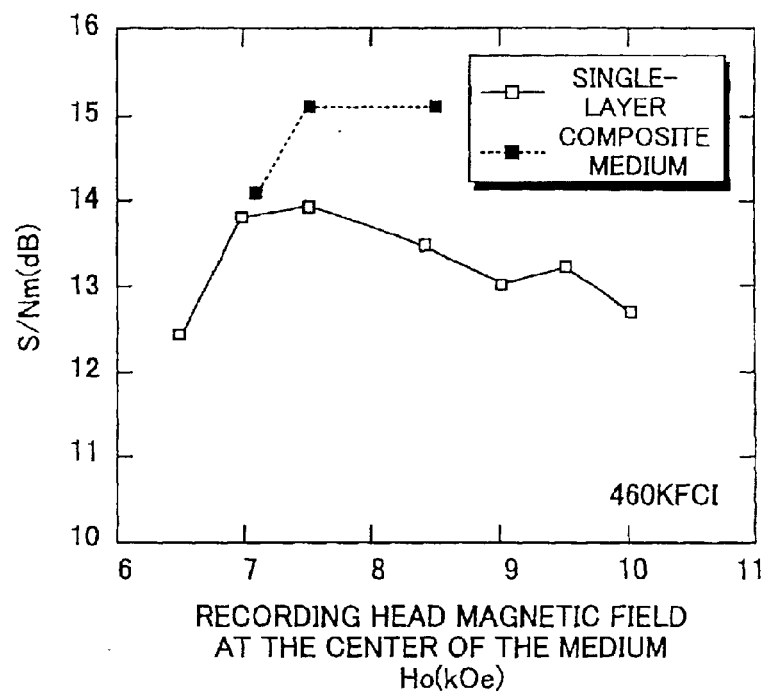
FIG. 8A is a diagram showing the magnetic field of the recording head and a corresponding S/N.
Figure 8B:
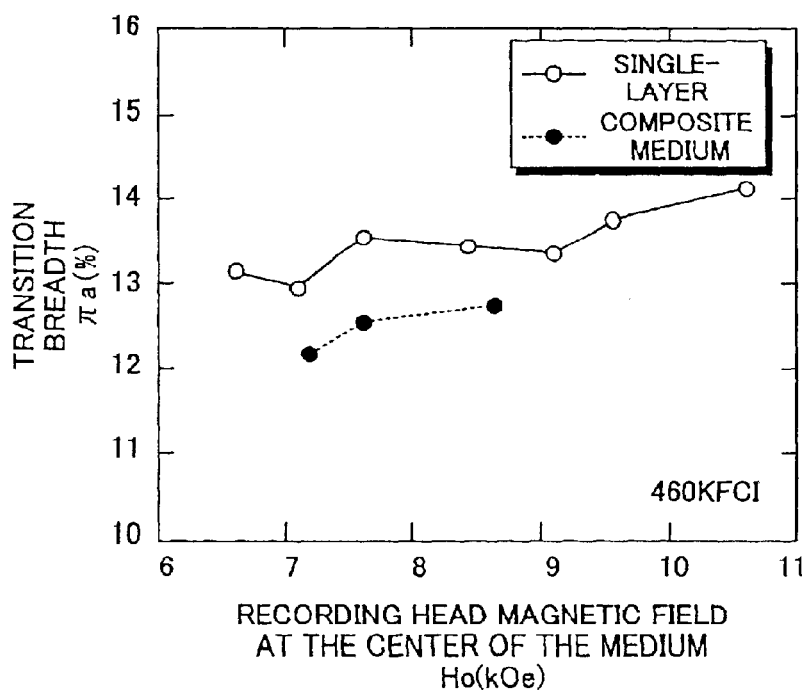
FIG. 8B is a diagram showing the magnetic field of the recording head and a corresponding transition breadth.

In the perpendicular/in-plane composite medium according to the present embodiment, the transition positions can be adjusted by setting the anisotropic magnetic field Hk of the perpendicular magnetic film, even when the magnetic field of the recording head is changed, as shown in FIG. 7. Accordingly, the perpendicular/in-plane composite medium exhibits a high S/N as shown in FIG. 8A, and has a decreased transition breadth as shown in FIG. 8B.

The heretofore-described perpendicular/in-plane composite medium according to the present embodiments can be provided as a magnetic recording medium with a high recording density that can obtain a high S/N ratio, in which the perpendicular magnetic film and the in-plane magnetic film are combined so as to restrain the occurrence of noises, while resting the distortion of the reproduction waveform.

Besides, regarding the above-described perpendicular/in-plane composite medium according to the present embodiments, the same results as above can be obtained in a simulation using a Micromagnetic model employing a Landau-Lifshitz-Gilbert equation. In this simulation, an analytic expression by Karlqvist assuming a ring head can be used for the magnetic field of the magnetic head, and a reciprocity theorem can be used for the reproduction output.

Figure 9:
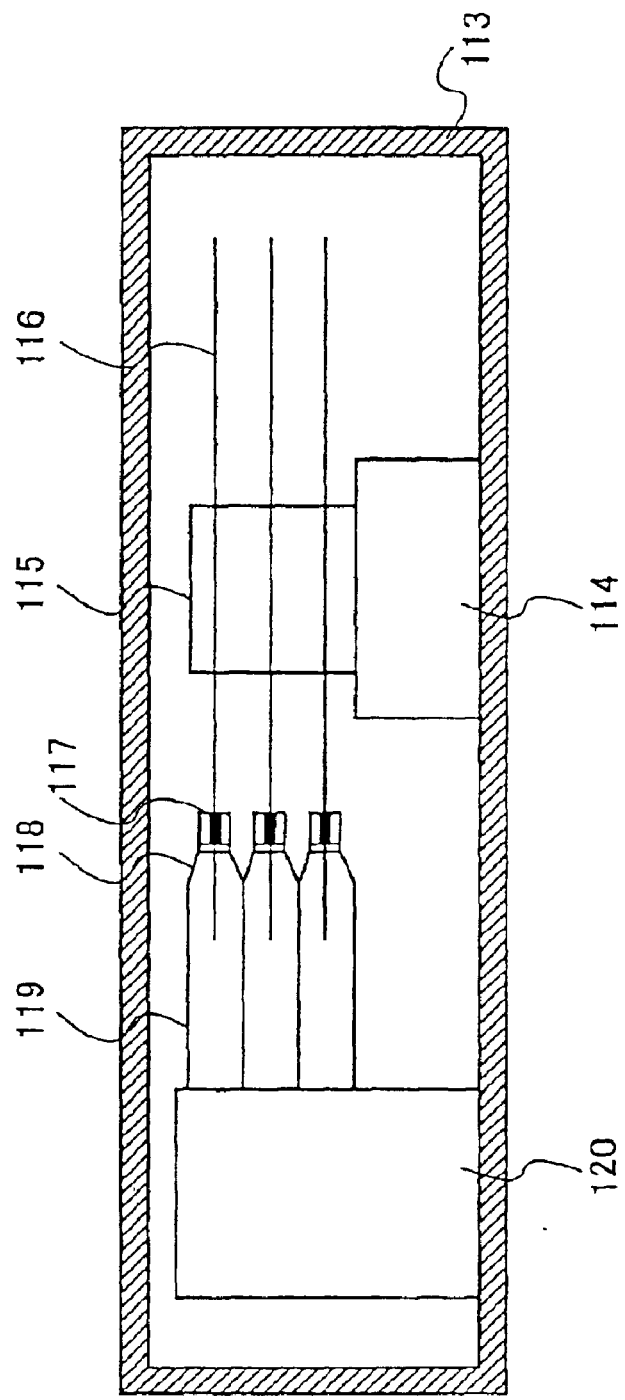
FIG. 9 is a cross-sectional view of a main structure of a magnetic recording and reproducing device according to an embodiment of the present invention.

Next, a description will be given, with reference to FIG. 9 and FIG. 10, of a magnetic recording and reproducing device according to an embodiment of the present invention. FIG. 9 is a cross-sectional view of a main structure of the magnetic recording and reproducing device according to the present embodiment. FIG. 10 is a plan view of the main structure of the magnetic recording and reproducing device according to the present embodiment.

As shown in FIG. 9 and FIG. 10, the magnetic recording and reproducing device mainly comprises a housing 113 including a motor 114, a hub 115, a plurality of magnetic recording mediums 116, a plurality of recording and reproducing heads 117, a plurality of suspensions 118, a plurality of arms 119, and an actuator unit 120. The magnetic recording mediums 116 are mounted to the hub 115 revolved by the motor 114. Each of the recording and reproducing head 117 is a recording and reproducing head of a composite type comprising a reproducing head, such as an MR head or a GMR head, and a recording head, such as an inductive head. Each of the recording and reproducing head 117 is mounted to an end of the corresponding arm 119 via the suspension 118. The arms 119 are driven by the actuator unit 120. The magnetic recording and reproducing device has a well-known basic structure; therefore, the basic structure will not be described in detail in this description.

The magnetic recording and reproducing device according to the present embodiment is characterized by the magnetic recording mediums 116. Each of the magnetic recording mediums 116 has the arrangement of, for example, the type ③ of the perpendicular/in-plane composite medium described above with reference to FIG. 5. The number of the magnetic recording mediums 116 is not limited to three, but may be one, two, four or more.

The basic structure of the magnetic recording and reproducing device is not limited to the structure shown in FIG. 9 and FIG. 10. The magnetic recording mediums used in the present invention is not limited to a magnetic disk.

The present invention is not limited to the specifically disclosed embodiments, and variations and modifications may be made without departing from the scope of the present invention.

The present application is based on Japanese priority application No. 2001-116020 filed on Apr. 13, 2001, the entire contents of which are hereby incorporated by reference.

What is claimed is:

1. A magnetic recording medium comprising:

a substrate;

a recording layer formed of an in-plane magnetic recording film, the in-plane magnetic recording film being formed on said substrate and having a magnetization easy axis in an in-plane direction; and a perpendicular magnetic film on said in-plane magnetic film, the perpendicular magnetic film having a magnetization easy axis oriented in a direction perpendicular to said magnetization easy axis of said in-plane magnetic film, wherein a tBr of said perpendicular magnetic film is set so as not to exceed one-fifth of a tBr of said in-plane magnetic recording film at the maximum, where the tBr is the product of a thickness and a residual magnetization.

2. The magnetic recording medium as claimed in claim 1, wherein said perpendicular magnetic film has a thickness not exceeding 5 nm at the maximum.

3. The magnetic recording medium as claimed in claim 1, wherein an anisotropic magnetic field Hk of said perpendicular magnetic film is set at least 1.2 times as large as an anisotropic magnetic field Hk of said in-plane magnetic recording film.

4. The magnetic recording medium as claimed in claim 1, further comprising a nonmagnetic spacer provided between said in-plane magnetic recording film and said perpendicular magnetic film.

5. The magnetic recording medium as claimed in claim 4, wherein said nonmagnetic spacer has a thickness not exceeding 2 nm.

6. The magnetic recording medium as claimed in claim 1, wherein said perpendicular magnetic film is formed of one of a Co-group alloy or a Co-group artificial lattice film.

7. A magnetic recording and reproducing device including:

a magnetic recording medium comprising:

a substrate;

a recording layer formed of an in-plane magnetic recording film, the in-plane magnetic recording film being formed on said substrate and having a magnetization easy axis in an in-plane direction; and a perpendicular magnetic film on said in-plane magnetic film, the perpendicular magnetic film having a magnetization easy axis oriented in a direction perpendicular to said magnetization easy axis of said in-plane magnetic recording film, wherein a tBr of said perpendicular magnetic film is set so as not to exceed one-fifth of a tBr of said in-plane magnetic recording film at the maximum, where the tBr is the product of a thickness and a residual magnetization.

8. A magnetic recording medium comprising:

a substrate;

a recording layer formed of an in-plane magnetic recording film, the in-plane magnetic recording film having a magnetization easy axis in an in-plane direction;

a perpendicular magnetic film formed on said in-plane magnetic recording film, the perpendicular magnetic film having a magnetization easy axis oriented in a direction perpendicular to said magnetization easy axis of said in-plane magnetic recording film; and a nonmagnetic spacer provided between said in-plane magnetic recording film and said perpendicular magnetic film, said nonmagnetic spacer layer having a first surface facing said substrate and a second surface facing away from said first surface such that said nonmagnetic spacer layer makes direct contact with said recording layer at said first surface, and makes direct contact with said perpendicular magnetic film at said second surface, wherein a tBr of said perpendicular magnetic film is set so as not to exceed one-fifth of a tBr of said in-plane magnetic recording film at the maximum, where the tBr is the product of a thickness and a residual magnetization, and wherein said perpendicular magnetic film has a thickness not exceeding 5 nm at the maximum.

* * * * *